United States Patent
Wang

(10) Patent No.: US 10,417,944 B2
(45) Date of Patent: Sep. 17, 2019

(54) METHOD AND SYSTEM OF MEASURING A TRANSPARENT EFFECT OF TRANSPARENT DISPLAY

(71) Applicant: Shenzhen China Star Optoelectronics Semiconductor Display Technology Co., Ltd., Shenzhen (CN)

(72) Inventor: Limin Wang, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

(*) Notice: Subject to any disclaimer, the term of this patent is extended or adjusted under 35 U.S.C. 154(b) by 1 day.

(21) Appl. No.: 15/578,247

(22) PCT Filed: Jul. 13, 2017

(86) PCT No.: PCT/CN2017/092870
§ 371 (c)(1),
(2) Date: Nov. 30, 2017

(87) PCT Pub. No.: WO2018/214255
PCT Pub. Date: Nov. 29, 2018

(65) Prior Publication Data
US 2018/0357943 A1 Dec. 13, 2018

(30) Foreign Application Priority Data
May 26, 2017 (CN) .......................... 2017 1 0395249

(51) Int. Cl.
G09G 3/00 (2006.01)
G02F 1/13 (2006.01)
(Continued)

(52) U.S. Cl.
CPC ........... *G09G 3/006* (2013.01); *G02F 1/1309* (2013.01); *G06F 3/0325* (2013.01);
(Continued)

(58) Field of Classification Search
CPC .. G09G 3/006; G09G 2360/18; G02F 1/1309; G01M 11/00; G01J 1/42
See application file for complete search history.

(56) References Cited

U.S. PATENT DOCUMENTS 9,341,572 B2 * 5/2016 Ma ........................ G01N 21/534
9,709,495 B2 * 7/2017 Kim ....................... G01N 21/59
9,818,320 B2 * 11/2017 Ma ............................. G01J 1/42

FOREIGN PATENT DOCUMENTS

CN 102967443 A 3/2013
CN 103900795 A 7/2014
(Continued)

Primary Examiner — Antonio A Caschera
(74) Attorney, Agent, or Firm — Leong C. Lei

(57) ABSTRACT

The luminance information acquiring module acquires luminance information of the background pattern in states having transparent display or not. The data processing module calculates the luminance gradation width of each black and white luminance horizontal cross point and each black and white luminance vertical cross point on the background pattern in states having transparent display or not and then, calculates a ratio of the luminance gradation width of each black and white luminance horizontal cross point and each black and white luminance vertical cross point in states having transparent display or not as clarities of the black and white luminance horizontal cross point and the black and white luminance vertical cross point and finally, calculates average values of the clarities of all the black and white luminance horizontal cross points and all the black and white luminance vertical cross points as a horizontal clarity and a vertical clarity.

12 Claims, 5 Drawing Sheets

(51) Int. Cl.
  *G06F 3/03* (2006.01)
  *G09G 3/3225* (2016.01)
  *G09G 3/36* (2006.01)

(52) U.S. Cl.
  CPC ......... *G09G 3/3225* (2013.01); *G09G 3/3648* (2013.01); *G09G 2360/16* (2013.01)

(56) References Cited

FOREIGN PATENT DOCUMENTS

| | | |
|---|---|---|
| CN | 104165753 A | 11/2014 |
| CN | 104931238 A | 9/2015 |
| CN | 105074507 A | 11/2015 |
| KR | 20150034465 A | 4/2015 |
| KR | 20160043179 A | 4/2016 |

\* cited by examiner

METHOD AND SYSTEM OF MEASURING A TRANSPARENT EFFECT OF TRANSPARENT DISPLAY

FIELD OF THE INVENTION

The present invention relates to a display measuring field, and more particularly to a method and a system of measuring a transparent effect of a transparent display.

BACKGROUND OF THE INVENTION

In the display field, Liquid Crystal Display (LCD), Organic Light Emitting Diode (OLED) and other panel display devices have been gradually replaced the Cathode Ray Tube (CRT) displays. The LCD (Liquid Crystal Display) possesses many advantages of being ultra thin, power saved and radiation free. It has been widely utilized. The Organic Light Emitting Display (OLED) display possesses many outstanding properties of self-illumination, low driving voltage, high luminescence efficiency, short response time, high clarity and contrast, near 180° view angle, wide range of working temperature, applicability of flexible display and large scale full color display and therefore is considered as a dream display. The OLED can be categorized as Passive matrix OLED (PMOLED) and (Active matrix OLED) AMOLED according to their driving types.

However, the LCD and OLED of prior art cannot be applied to all occasions, such as displaying and meanwhile, allowing to see the scene behind the monitor through the monitor. The transparent display for meeting such needs as a new display technology has drawn more and more attentions. The transparent display allows the audience can watch the background behind the display through the display at the same time as showing images and can be provided as an excellent carrier of exhibition and the augmented reality (AR) enhancement.

The transparent display possesses the transparent features. However, because there are many micro structures, such as transparent display window, cathode, anode and signal line in the transparent display, the transmission of light will be affected by these micro structures to result in diffusion so that the background pattern will have luminance attenuation through the transparent display and also have edge blur phenomenon at the same time to affect the transparency effect. The measurement and evaluation for the transparent effect of transparent display are very important. Since the transparent display structure is different from the LCD and the OLED of prior art, there is no standard measurement method and effective measurement device used to measure the transparent effect of transparent display. Thus, no unified evaluation and comparison can be conducted for the transparent display products to objectively and truly reflect the product performance. In certain level, it blocks the further development of the transparent display technology.

The invention application of publication No. CN 104931238 A proposes a device and a method of testing the transparent effect of the transparent display. The loss of the absolute value of the luminance is mainly considered in the patent concept without considering the effect of the micro structure of the transparent display to the transmitted light. The transparent effect of the transparent display cannot be measured well.

The invention application of publication No. CN 105049842 A proposes a system and a method of evaluating the display quality of the transparent display. Although, the influence of the micro structures in the transparent display to the diffusion of the transmitted light is considered. However, the condition requirement for the testing solution is high and the testing device and the method are more complicated. The cost and difficulty are high.

SUMMARY OF THE INVENTION

An objective of the present invention is to provide a method of measuring a transparent effect of a transparent display, which can easily and effectively measure the transparent effect of the transparent display and can provide the basis for the comparison of the properties of the different transparent displays. The measurement results are not affected by ambient luminance, thus are accurate and reliable.

Another objective of the present invention is to provide a system of measuring a transparent effect of a transparent display, which can easily and effectively measure the transparent effect of the transparent display and can provide the basis for the comparison of the properties of the different transparent displays.

For realizing the aforesaid objectives, the present invention provides a method of measuring a transparent effect of a transparent display, comprising steps of:

Step S1, providing a data processing module, a luminance information acquiring module of communicating with the data processing module and a background pattern for acquiring luminance information by the luminance information acquiring module;

wherein the background pattern comprises a white background and a black background surrounding the white background;

Step S2, defining a plurality of horizontal test lines and a plurality of vertical test lines to the background pattern; wherein each of the horizontal test lines is through the white background and the black background with two black and white luminance horizontal cross points; each of the vertical test lines is through the white background and the black background with two black and white luminance vertical cross points;

Step S3, measuring the background pattern directly to obtain an original luminance information of the background pattern and transmitting the original luminance information of the background pattern to the data processing module by the luminance information acquiring module;

wherein the data processing module calculates and stores a luminance gradation width at the two black and white luminance horizontal cross points of each of the horizontal test lines and a luminance gradation width at the two black and white luminance vertical cross points of each of the vertical test lines in an original state;

Step S4, providing the transparent display and positioning the transparent display between the luminance information acquiring module and the background pattern;

Step S5, measuring the transparent display to obtain the luminance information of the background pattern diffused by the transparent display and transmitting the luminance information of the background pattern diffused by the transparent display to the data processing module by the luminance information acquiring module;

wherein the data processing module calculates and stores luminance gradation widths at the two black and white luminance horizontal cross points of each of the horizontal test lines and luminance gradation widths at the two black and white luminance vertical cross points of each of the vertical test lines in a state having the transparent display;

Step S6, calculating a ratio of the luminance gradation widths of each of the black and white luminance horizontal cross points of the states having the transparent display or not as a clarity of the black and white luminance horizontal cross point by the data processing module, wherein:

$CH_{i1} = dH'_{i1}/dH_{i1}$ $CH_{i2} = dH'_{i2}/dH_{i2}$ $CH_{i1}$ and $CH_{i2}$ respectively represent the clarities of the two black and white luminance horizontal cross points of an ith horizontal test line, $dH_{i1}$ and $dH_{i2}$ respectively represent the luminance gradation widths of the two black and white luminance horizontal cross points of the ith horizontal test line in the original state, $dH'_{i1}$ and $dH'_{i2}$ respectively represent the luminance gradation widths of the two black and white luminance horizontal cross points of the ith horizontal test line in the state having the transparent display, i is an integer;

and calculating a ratio of the luminance gradation widths of each of the black and white luminance vertical cross points of the states having the transparent display or not as a clarity of the black and white luminance vertical cross point by the data processing module, wherein:

$CV_{n1} = dV'_{n1}/dV_{n1}$ $CV_{n2} = dV'_{n2}/dV_{n2}$ $CV_{n1}$ and $CV_{n2}$ respectively represent the clarities of the two black and white luminance vertical cross points of an nth vertical test line, $dV_{n1}$ and $dV_{n2}$ respectively represent the luminance gradation widths of the two black and white luminance vertical cross points of the nth vertical test line in the original state, $dV'_{n1}$ and $dV'_{n2}$ respectively represent the luminance gradation widths of the two black and white luminance vertical cross points of the nth vertical test line in the state having the transparent display, n is an integer;

Step S7, calculating an average value of the clarities of all the black and white luminance horizontal cross points as a horizontal clarity of the transparent display and determining a horizontal transparent effect of the transparent display according to the horizontal clarity by the data processing module; and calculating an average value of the clarities of all the black and white luminance vertical cross points as a vertical clarity of the transparent display and determining a vertical transparent effect of the transparent display according to the vertical clarity by the data processing module.

As the horizontal clarity of the transparent display is equal to 1, the horizontal transparent effect of the transparent display is determined to be the best; as the horizontal clarity of the transparent display is larger than 1, the horizontal transparent effect of the transparent display is determined to be worse when the horizontal clarity is larger;

as the vertical clarity of the transparent display is equal to 1, the vertical transparent effect of the transparent display is determined to be the best; as the vertical clarity of the transparent display is larger than 1, the vertical transparent effect of the transparent display is determined to be worse when the vertical clarity is larger.

The data processing module is a computer.

The luminance information acquiring module is a luminance meter or an image sensor.

The transparent display is an active matrix organic light emitting diode transparent display or a liquid crystal transparent display.

The luminance gradient width is a distance corresponding to a luminance variation of 10% to 90% during a luminance gradation.

The present invention further provides a system of measuring a transparent effect of a transparent display, comprising a data processing module, a luminance information acquiring module of communicating with the data processing module, a background pattern for acquiring luminance information by the luminance information acquiring module and a transparent display;

wherein the luminance information acquiring module measures the background pattern directly to obtain an original luminance information of the background pattern and transmits the original luminance information of the background pattern to the data processing module in a state having no transparent display; the luminance information acquiring module measures the transparent display to obtain the luminance information of the background pattern diffused by the transparent display and transmits the luminance information of the background pattern diffused by the transparent display to the data processing module in a state of adding the transparent display between the luminance information acquiring module and the background pattern;

wherein the data processing module calculates a horizontal clarity of the transparent display according to the original luminance information of the background pattern obtained by the luminance information acquiring module and the luminance information of the background pattern diffused by the transparent display and determines a horizontal transparent effect of the transparent display according to the horizontal clarity; and the data processing module calculates a vertical clarity of the transparent display and determines a vertical transparent effect of the transparent display according to the vertical clarity.

The data processing module is a computer.

The luminance information acquiring module is a luminance meter or an image sensor.

The transparent display is an active matrix organic light emitting diode transparent display or a liquid crystal transparent display.

The present invention further provides a method of measuring a transparent effect of a transparent display, comprising steps of:

Step S1, providing a data processing module, a luminance information acquiring module of communicating with the data processing module and a background pattern for acquiring luminance information by the luminance information acquiring module;

wherein the background pattern comprises a white background and a black background surrounding the white background;

Step S2, defining a plurality of horizontal test lines and a plurality of vertical test lines to the background pattern; wherein each of the horizontal test lines is through the white background and the black background with two black and white luminance horizontal cross points; each of the vertical test lines is through the white background and the black background with two black and white luminance vertical cross points;

Step S3, measuring the background pattern directly to obtain an original luminance information of the background pattern and transmitting the original luminance information of the background pattern to the data processing module by the luminance information acquiring module;

wherein the data processing module calculates and stores a luminance gradation width at the two black and white luminance horizontal cross points of each of the horizontal test lines and a luminance gradation width at the two black and white luminance vertical cross points of each of the vertical test lines in an original state;

Step S4, providing the transparent display and positioning the transparent display between the luminance information acquiring module and the background pattern;

Step S5, measuring the transparent display to obtain the luminance information of the background pattern diffused by the transparent display and transmitting the luminance information of the background pattern diffused by the transparent display to the data processing module by the luminance information acquiring module;

wherein the data processing module calculates and stores luminance gradation widths at the two black and white luminance horizontal cross points of each of the horizontal test lines and luminance gradation widths at the two black and white luminance vertical cross points of each of the vertical test lines in a state having the transparent display;

Step S6, calculating a ratio of the luminance gradation widths of each of the black and white luminance horizontal cross points of the states having the transparent display or not as a clarity of the black and white luminance horizontal cross point by the data processing module, wherein:

$CH_{i1}=dH'_{i1}/dH_{i1}$
$CH_{i2}=dH'_{i2}/dH_{i2}$ $CH_{i1}$ and $CH_{i2}$ respectively represent the clarities of the two black and white luminance horizontal cross points of an ith horizontal test line, $dH_{i1}$ and $dH_{i2}$ respectively represent the luminance gradation widths of the two black and white luminance horizontal cross points of the ith horizontal test line in the original state, $dH'_{i1}$ and $dH'_{i2}$ respectively represent the luminance gradation widths of the two black and white luminance horizontal cross points of the ith horizontal test line in the state having the transparent display, i is an integer;

and calculating a ratio of the luminance gradation widths of each of the black and white luminance vertical cross points of the states having the transparent display or not as a clarity of the black and white luminance vertical cross point by the data processing module, wherein:

$CV_{n1}=dV'_{n1}/dV_{n1}$
$CV_{n2}=dV'_{n2}/dV_{n2}$ $CV_{n1}$ and $CV_{n2}$ respectively represent the clarities of the two black and white luminance vertical cross points of an nth vertical test line, $dV_{n1}$ and $dV_{n2}$ respectively represent the luminance gradation widths of the two black and white luminance vertical cross points of the nth vertical test line in the original state, $dV'_{n1}$ and $dV'_{n2}$ respectively represent the luminance gradation widths of the two black and white luminance vertical cross points of the nth vertical test line in the state having the transparent display, n is an integer;

Step S7, calculating an average value of the clarities of all the black and white luminance horizontal cross points as a horizontal clarity of the transparent display and determining a horizontal transparent effect of the transparent display according to the horizontal clarity by the data processing module; and calculating an average value of the clarities of all the black and white luminance vertical cross points as a vertical clarity of the transparent display and determining a vertical transparent effect of the transparent display according to the vertical clarity by the data processing module;

wherein as the horizontal clarity of the transparent display is equal to 1, the horizontal transparent effect of the transparent display is determined to be the best; as the horizontal clarity of the transparent display is larger than 1, the horizontal transparent effect of the transparent display is determined to be worse when the horizontal clarity is larger;

wherein as the vertical clarity of the transparent display is equal to 1, the vertical transparent effect of the transparent display is determined to be the best; as the vertical clarity of the transparent display is larger than 1, the vertical transparent effect of the transparent display is determined to be worse when the vertical clarity is larger;

wherein the data processing module is a computer;

wherein the luminance information acquiring module is a luminance meter or an image sensor;

wherein the luminance gradient width is a distance corresponding to a luminance variation of 10% to 90% during a luminance gradation.

The benefits of the present invention are: the present invention provides a method of measuring a transparent effect of a transparent display, comprising: first, measuring the background pattern directly to obtain an original luminance information of the background pattern and transmitting the original luminance information of the background pattern to the data processing module by the luminance information acquiring module; calculating the luminance gradation width of each of the black and white luminance horizontal cross points and luminance gradation width of each of the black and white luminance vertical cross points on the background pattern in the original state having no the transparent display respectively by the data processing module; then, adding the transparent display between the luminance information acquiring module and the background pattern and measuring the transparent display by the luminance information acquiring module to obtain the luminance information of the background pattern diffused by the transparent display and calculating calculates the luminance gradation width of each of the black and white luminance horizontal cross points and luminance gradation width of each of the black and white luminance vertical cross points by the data processing module; then, calculating a ratio of the luminance gradation widths of each of the black and white luminance horizontal cross points and a ratio of the luminance gradation widths of each of the black and white luminance vertical cross points in the states having the transparent display or not as a clarity of the corresponding black and white luminance horizontal cross point and a clarity of the corresponding black and white luminance vertical cross point by the data processing module and finally, calculating an average value of the clarities of all the black and white luminance horizontal cross points as a horizontal clarity of the transparent display and determining a horizontal transparent effect of the transparent display according to the horizontal clarity by the data processing module; and calculating an average value of the clarities of all the black and white luminance vertical cross points as a vertical clarity of the transparent display and determining a vertical transparent effect of the transparent display according to the vertical clarity by the data processing module. The present invention can easily and effectively measure the transparent effect of the transparent display and can provide the basis for the comparison of the properties of the different transparent displays. The measurement results are not affected by ambient luminance, thus are accurate and reliable. The present invention provides a system of measuring a transparent effect of a transparent display, comprising a data processing module, a luminance information acquiring module, a background pattern and a transparent display. The luminance information acquiring module acquires the luminance information of the background pattern in the states having the transparent display or not respectively. The data processing module calculates a ratio of the luminance gradation widths of each of the black and white luminance horizontal cross points and a ratio of the luminance gradation widths of each of the black and white luminance vertical cross points on the background pattern in the states having the transparent display or not as a clarity of the corresponding black and white luminance horizontal cross point and a clarity of the corresponding black and white luminance vertical cross point. Then, the data processing module calculates an average value of the clarities of all the black and white luminance horizontal cross points as a horizontal clarity of the transparent display and determines a horizontal transparent effect of the transparent display according to the horizontal clarity and calculates an average value of the clarities of all the black and white luminance vertical cross points as a vertical clarity of the transparent display and determines a vertical transparent effect of the transparent display according to the vertical clarity. The system can easily and effectively measure the transparent effect of the transparent display and can provide the basis for the comparison of the properties of the different transparent displays.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
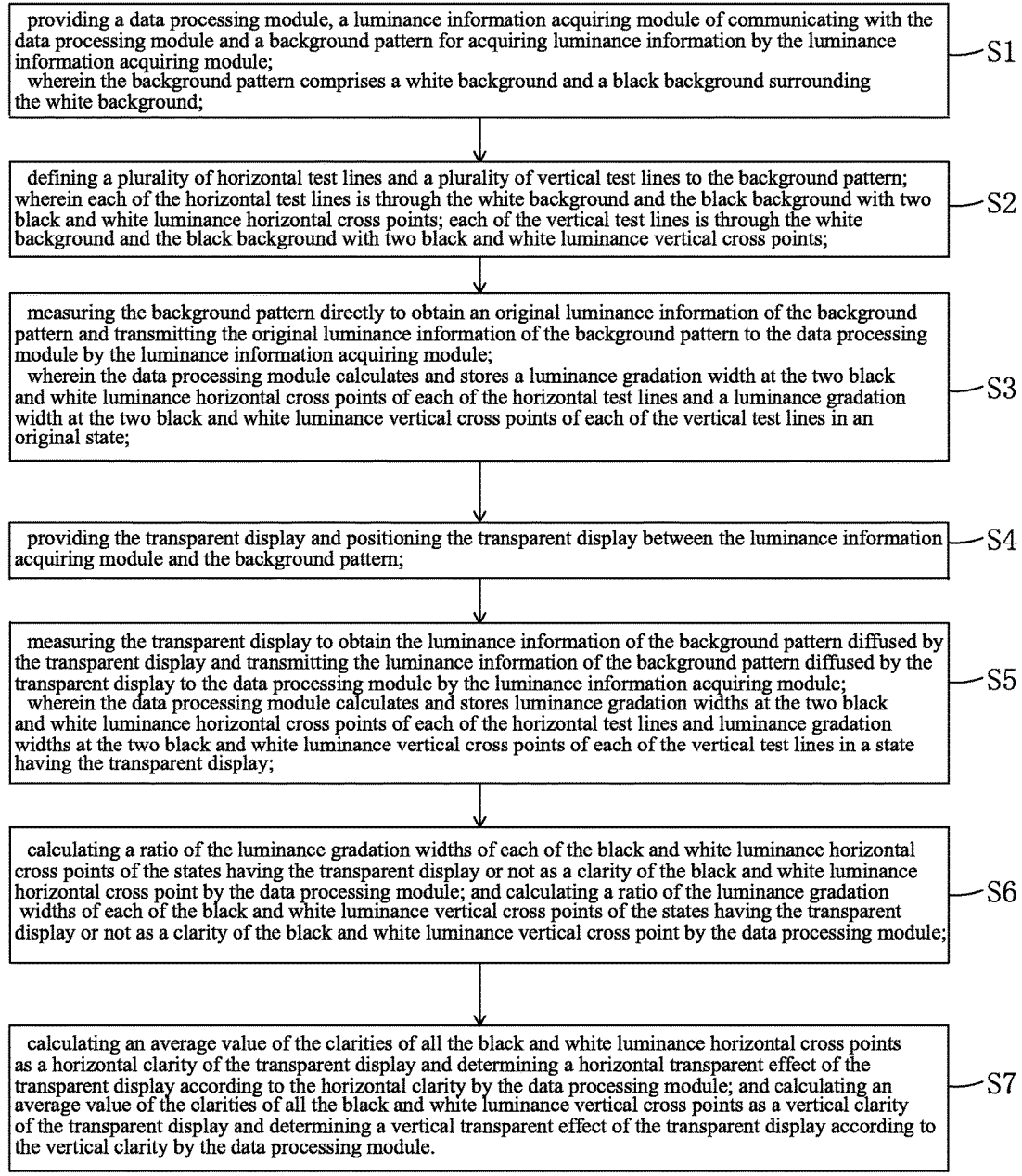
FIG. 1 is a flowchart of a method of measuring a transparent effect of a transparent display according to the present invention.
Figure 2:
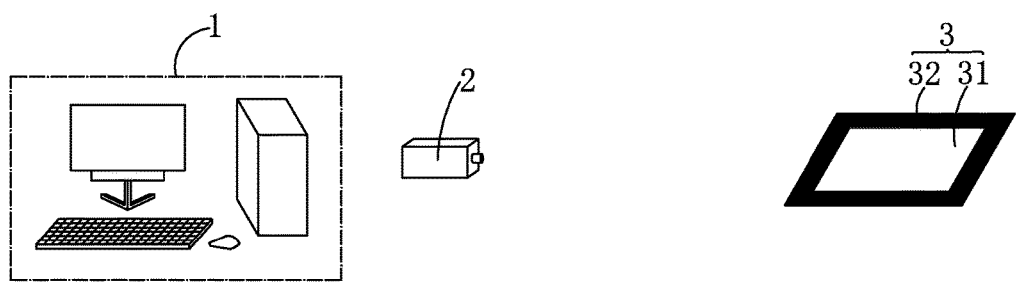
FIG. 2 is a diagram of Step Si of a method of measuring a transparent effect of a transparent display according to the present invention.

Please refer to FIG. 1. The present invention first provides a method of measuring a transparent effect of a transparent display, comprising steps of:

Step S1, as shown in FIG. 2, providing a data processing module 1, a luminance information acquiring module 2 of communicating with the data processing module 1 and a background pattern 3 for acquiring luminance information by the luminance information acquiring module 2.

Specifically, the data processing module 1 is preferably a computer.

The luminance information acquiring module 2 is preferably a luminance meter or an image sensor.

The background pattern 3 comprises a white background 31 and a black background 32 surrounding the white background 31.

Figure 3:
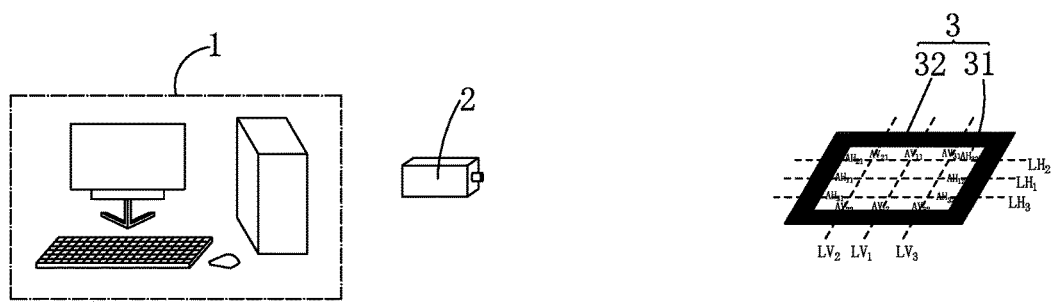
FIG. 3 is a diagram of Step S2 of a method of measuring a transparent effect of a transparent display according to the present invention.

Step S2, as shown in FIG. 3, setting i and n to be positive integers and defining a plurality of horizontal test lines $LH_i$ and a plurality of vertical test lines $LV_n$ to the background pattern 3; wherein each of the horizontal test lines $LH_i$ is through the white background 31 and the black background 32 with two black and white luminance horizontal cross points $AH_{i1}$ and $AH_{i2}$; each of the vertical test lines $LV_n$ is through the white background 31 and the black background 32 with two black and white luminance vertical cross points $AV_{n1}$ and $AH_{n2}$.

In particular, the number of horizontal test lines and the number of vertical test lines are not limited and the more the numbers are, the more accurate the final measurement result is. As being illustrated in FIG. 2, the number of the horizontal test lines $LH_1$ is three, which respectively are $LH_1$, $LH_2$ and $LH_3$. $LH_1$ has two black and white luminance horizontal cross points $AH_{11}$ and $AH_{12}$. $LH_2$ has two black and white luminance horizontal cross points $AH_{21}$ and $AH_{22}$. $LH_3$ has two black and white luminance horizontal cross points $AH_{31}$ and $AH_{32}$. The number of the vertical test lines $LV_n$ is three, which respectively are $LV_1$, $LV_2$ and $LV_3$. $LV_1$ has two black and white luminance vertical cross points $AV_{11}$ and $AV_{12}$. $LV_2$ has two black and white luminance vertical cross points $AV_{21}$ and $AV_{22}$. $LV_3$ has two black and white luminance vertical cross points $AV_{31}$ and $AV_{32}$.

Step S3, measuring the background pattern 3 directly to obtain an original luminance information of the background pattern 3 and transmitting the original luminance information of the background pattern 3 to the data processing module 1 by the luminance information acquiring module 2.

The data processing module 1 calculates and stores luminance gradation widths $dH_{i1}$ and $dH_{i2}$ at the two black and white luminance horizontal cross points $AH_{i1}$ and $AH_{i2}$ of each of the horizontal test lines $LH_i$ and luminance gradation widths $dV_{n1}$ and $dV_{n2}$ at the two black and white luminance vertical cross points $AV_{n1}$ and $AV_{n2}$ of each of the vertical test lines $LV_n$ in an original state.

Specifically, the luminance gradient width is a distance corresponding to a luminance variation of 10% to 90% during a luminance gradation.

Figure 4:
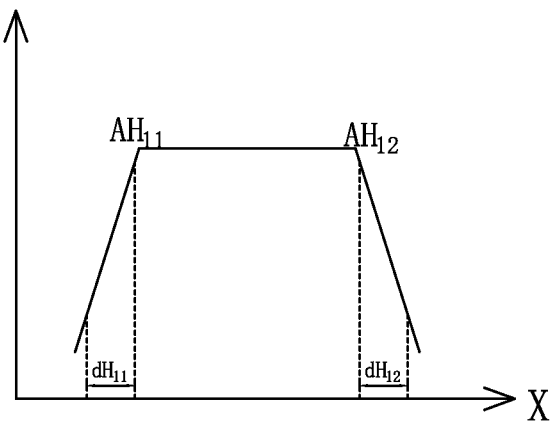
FIG. 4 is a diagram of luminance gradation widths of two black and white luminance horizontal cross points of a horizontal test line in Step S3 of a method of measuring a transparent effect of a transparent display according to the present invention.

As being illustrated in FIG. 4, X represents the horizontal direction. In the original state, the luminance gradation widths at the two black and white luminance horizontal cross points $AH_{11}$ and $AH_{12}$ of the horizontal test line $LH_1$ respectively are $dH_{11}$ and $dH_{12}$. Similarly, the luminance gradation widths at the two black and white luminance horizontal cross points $AH_{21}$ and $AH_{22}$ of the horizontal test line $LH_2$ respectively are $dH_{21}$ and $dH_{22}$ (not shown) and the luminance gradation widths at the two black and white luminance horizontal cross points $AH_{31}$ and $AH_{32}$ of the horizontal test line $LH_3$ respectively are $dH_{31}$ and $dH_{32}$ (not shown).

Figure 5:
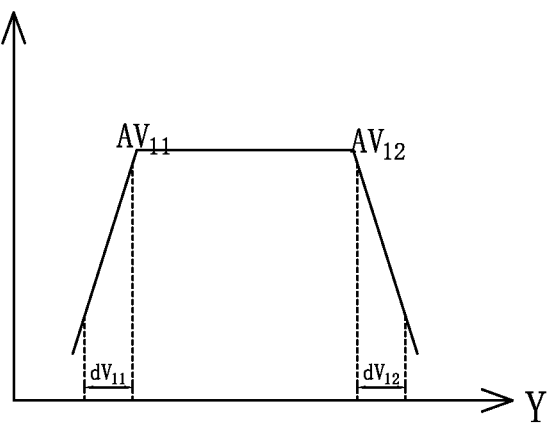
FIG. 5 is a diagram of luminance gradation widths of two black and white luminance vertical cross points of a vertical test line in Step S3 of a method of measuring a transparent effect of a transparent display according to the present invention.

As being illustrated in FIG. 5, Y represents the vertical direction. In the original state, the luminance gradation widths at the two black and white luminance vertical cross points $AV_{11}$ and $AV_{12}$ of the vertical test line $LV_1$ respectively are $dV_{11}$ and $dV_{12}$. Similarly, the luminance gradation widths at the two black and white luminance vertical cross points $AV_{21}$ and $AV_{22}$ of the vertical test line $LV_2$ respectively are $dV_{21}$ and $dV_{22}$ (not shown) and the luminance gradation widths at the two black and white luminance vertical cross points $AV_{31}$ and $AV_{32}$ of the vertical test line $LV_3$ respectively are $dV_{31}$ and $dV_{32}$ (not shown).

Figure 6:
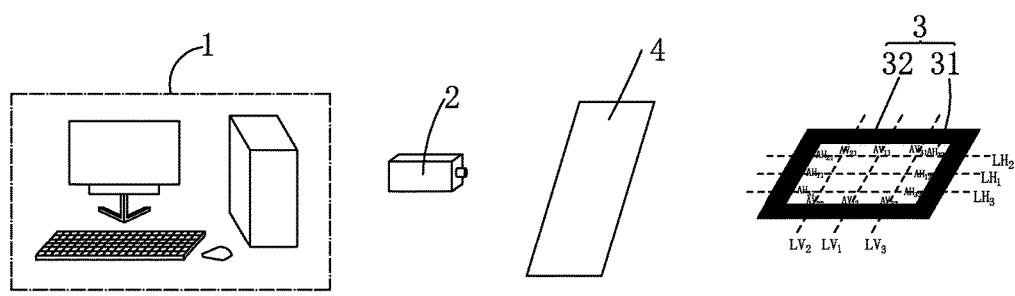
FIG. 6 is a diagram of Step S4 of a method of measuring a transparent effect of a transparent display according to the present invention and a structure diagram of a system of measuring a transparent effect of a transparent display according to the present invention.

Step S4, as shown in FIG. 6, providing the transparent display 4 and positioning the transparent display 4 between the luminance information acquiring module 2 and the background pattern 3.

Specifically, the transparent display 4 can be an active matrix organic light emitting diode transparent display or a liquid crystal transparent display.

Step S5, measuring the transparent display 4 to obtain the luminance information of the background pattern 3 diffused by the transparent display 4 and transmitting the luminance information of the background pattern 3 diffused by the transparent display 4 to the data processing module 1 by the luminance information acquiring module 2.

The data processing module 1 calculates and stores luminance gradation widths $dH'_{i1}$ and $dH'_{i2}$ at the two black and white luminance horizontal cross points $AH_{i1}$ and $AH_{i2}$ of each of the horizontal test lines $LH_i$ and luminance gradation widths $dV'_{n1}$ and $dV'_{n2}$ at the two black and white luminance vertical cross points $AV_{n1}$ and $AV_{n2}$ of each of the vertical test lines $LV_n$ in a state having the transparent display 4.

Figure 7:
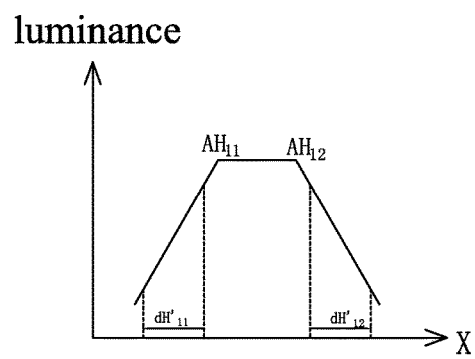
FIG. 7 is a diagram of luminance gradation widths of two black and white luminance horizontal cross points of a horizontal test line in Step S5 of a method of measuring a transparent effect of a transparent display according to the present invention.

As being illustrated in FIG. 7, in the state having the transparent display 4, the luminance gradation widths at the two black and white luminance horizontal cross points $AH_{11}$ and $AH_{12}$ of the horizontal test line $LH_1$ respectively are $dH'_{11}$ and $dH'_{12}$. Similarly, the luminance gradation widths at the two black and white luminance horizontal cross points $AH_{21}$ and $AH_{22}$ of the horizontal test line $LH_2$ respectively are $dH'_{21}$ and $dH'_{22}$ (not shown) and the luminance gradation widths at the two black and white luminance horizontal cross points $AH_{31}$ and $AH_{32}$ of the horizontal test line $LH_3$ respectively are $dH'_{31}$ and $dH'_{32}$ (not shown).

Figure 8:
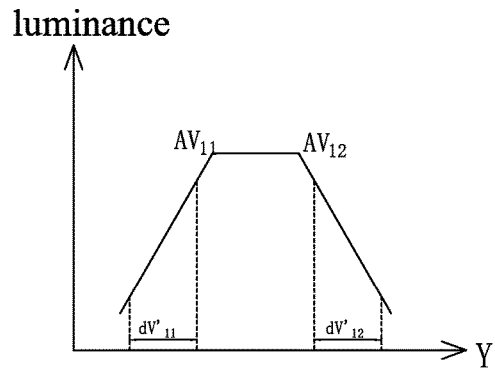
FIG. 8 is a diagram of luminance gradation widths of two black and white luminance vertical cross points of a vertical test line in Step S5 of a method of measuring a transparent effect of a transparent display according to the present invention.

As being illustrated in FIG. 8, in the state having the transparent display 4, the luminance gradation widths at the two black and white luminance vertical cross points $AV_{11}$ and $AV_{12}$ of the vertical test line $LV_1$ respectively are $dV'_{11}$ and $dV'_{12}$. Similarly, the luminance gradation widths at the two black and white luminance vertical cross points $AV_{21}$ and $AV_{22}$ of the vertical test line $LV_2$ respectively are $dV'_{21}$ and $dV'_{22}$ (not shown) and the luminance gradation widths at the two black and white luminance vertical cross points $AV'_{31}$ and $AV'_{32}$ of the vertical test line $LV_3$ respectively are $dV_{31}$ and $dV_{32}$ (not shown).

Significantly, because there are many micro structures, such as transparent display window, cathode, anode and signal line in the transparent display 4, the transmission of light will be affected by these micro structures to result in diffusion so that the background pattern 3 observed through the transparent display 4 will have luminance attenuation and also have edge blur phenomenon at the same time. The luminance gradation width from a low luminance region to a high luminance region becomes longer.

Step S6, calculating a ratio of the luminance gradation widths of each of the black and white luminance horizontal cross points of the states having the transparent display 4 or not as a clarity of the black and white luminance horizontal cross point by the data processing module 1, wherein:

$CH_{i1}=dH'_{i1}/dH_{i1}$ $CH_{i2}=dH'_{i2}/dH_{i2}$ $CH_{i1}$ and $CH_{i2}$ respectively represent the clarities of the two black and white luminance horizontal cross points $AH_{i1}$ and $AH_{i2}$ of an ith horizontal test line $LH_i$, $dH_{i1}$ and $dH_2$ respectively represent the luminance gradation widths of the two black and white luminance horizontal cross points $AH_{i1}$ and $AH_{i2}$ of the ith horizontal test line $LH_1$ in the original state, $dH'_{i1}$ and $dH'_{i2}$ respectively represent the luminance gradation widths of the two black and white luminance horizontal cross points $AH_{i1}$ and $AH_{i2}$ of the ith horizontal test line $LH_i$ in the state having the transparent display 4;

Following the embodiment of FIG. 3 and FIG. 6:

$CH_{11}=dH'_{11}/dH_{11}$ $CH_{12}=dH'_{12}/dH_{12}$ $CH_{21}=dH'_{21}/dH_{21}$ $CH_{22}=dH'_{22}/dH_{22}$ $CH_{31}=dH'_{31}/dH_{31}$ $CH_{32}=dH'_{32}/dH_{32}$ and calculating a ratio of the luminance gradation widths of each of the black and white luminance vertical cross points of the states having the transparent display 4 or not as a clarity of the black and white luminance vertical cross point by the data processing module, wherein:

$CV_{n1}=dV_{n1}/dV_{n1}$ $CV_{n2}=dV_{n2}/dV_{n2}$ $CV_{n1}$ and $CV_{n2}$ respectively represent the clarities of the two black and white luminance vertical cross points $AV_{n1}$ and $AV_{n2}$ of an nth vertical test line $LV_n$, $dV_{n1}$ and $dV_{n2}$ respectively represent the luminance gradation widths of the two black and white luminance vertical cross points $AV_{n1}$ and $AV_{n2}$ of the nth vertical test line $LV_n$ in the original state, $dV'_{n1}$ and $dV'_{n2}$ respectively represent the luminance gradation widths of the two black and white luminance vertical cross points $AV_{n1}$ and $AV_{n2}$ of the nth vertical test line $LV_n$ in the state having the transparent display 4.

Following the embodiment of FIG. 3 and FIG. 6:

$CV_{11}=dV'_{11}/dV_{11}$ $CV_{12}=dV'_{12}/dV_{12}$ $CV_{21}=dV'_{21}/dV_{21}$ $CV_{22}=dV'_{22}/dV_{22}$ $CV_{31}=dV'_{31}/dV_{31}$ $CV_{32}=dV'_{32}/dV_{32}$.

Step S7, calculating an average value of the clarities of all the black and white luminance horizontal cross points as a horizontal clarity CH of the transparent display 4 and determining a horizontal transparent effect of the transparent display 4 according to the horizontal clarity CH by the data processing module 1; and calculating an average value of the clarities of all the black and white luminance vertical cross points as a vertical clarity CV of the transparent display 4 and determining a vertical transparent effect of the transparent display 4 according to the vertical clarity CV by the data processing module 1.

Specifically, following the embodiment of FIG. 3 and FIG. 6:

$CH=(CH_{11}+CH_{12}+CH_{21}+CH_{22}+CH_{31}+CH_{32})/6$ $CV=(CV_{11}+CV_{12}+CV_{21}+CV_{22}+CV_{31}+CV_{32})/6$

Considering that the horizontal diffusion degree and the vertical diffusion degree of the micro structures such as the internal signal lines of the transparent display 4 are not consistent to result in the horizontal clarity and the vertical clarity have difference. The method of measuring the transparent effect of the transparent display calculates the horizontal clarity CH and the vertical clarity CV respectively to determine the horizontal effect and the vertical effect of the transparent display 4. The practicability is stronger.

Furthermore, as the horizontal clarity CH of the transparent display 4 is equal to 1, it means that transparent display 4 does not diffuse the transmitted light in the horizontal direction and the horizontal transparent effect of the transparent display 4 is determined to be the best; as the horizontal clarity CH of the transparent display 4 is larger than 1, the horizontal transparent effect of the transparent display 4 is determined to be worse when the horizontal clarity CH is larger. As the vertical clarity CV of the transparent display 4 is equal to 1, it means that transparent display 4 does not diffuse the transmitted light in the vertical direction and the vertical transparent effect of the transparent display 4 is determined to be the best; as the horizontal clarity CV of the transparent display 4 is larger than 1, the vertical transparent effect of the transparent display 4 is determined to be worse when the vertical clarity CV is larger.

Figure 9:
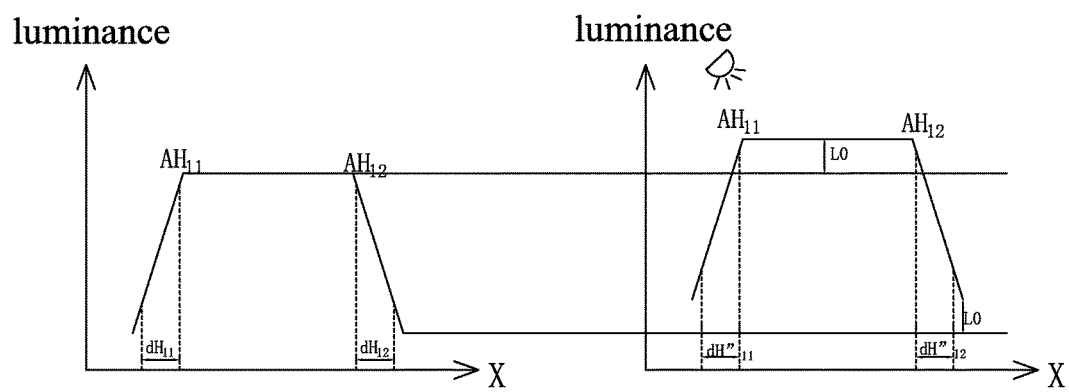
FIG. 9 is a diagram that the method of measuring the transparent effect of the transparent display according to the present invention is not affected by the ambient luminance.

Significantly, in the method of measuring the transparent effect of the transparent display according to the present invention, the respective luminance gradation widths are not affected by the ambient luminance. As shown in FIG. 9, although the ambient luminance will affect the information of the luminance, which is shown in FIG. 9 that the right side of the luminance curve is higher than the left side of the luminance curve. However, in a fixed ambient luminance, since each of the bright areas and each of the dark areas of the background pattern 3 are affected by the same ambience. The relationship between the luminance gradation and the position is not affected by the ambient luminance. The luminance gradation width remains unchanged. As regarding the horizontal test line $LH_1$:

$dH_{11} = dH''_{11}$
$dH_{12} = dH''_{12}$ $dH''_{11}$ and $dH''_{12}$ respectively represents the luminance gradation widths at the two black and white luminance horizontal cross points $AH_{11}$ and $AH_{12}$ of the horizontal test line $LH_1$ in the ambient luminance LO.

It is still the same for other horizontal test lines and other vertical test lines regardless of presence or absence of the transparent display. Thus, the horizontal clarity CH and the vertical clarity CV which are ultimately obtained by calculation will not be affected by the ambient luminance.

The aforesaid method of measuring the transparent effect of the transparent display can easily and effectively measure the transparent effect of the transparent display and can provide the basis for the comparison of the properties of the different transparent displays. The measurement results are not affected by ambient luminance, thus are accurate and reliable.

Please refer to FIG. 2, FIG. 3 and FIG. 6. On the basis of the same inventive idea, the present invention further provides a system of measuring a transparent effect of a transparent display, comprising a data processing module 1, a luminance information acquiring module 2 of communicating with the data processing module 1, a background pattern 3 for acquiring luminance information by the luminance information acquiring module 2 and a transparent display 4.

Specifically, the data processing module 1 is a computer; the luminance information acquiring module 2 is preferably a luminance meter or an image sensor; and the transparent display 4 is an active matrix organic light emitting diode transparent display or a liquid crystal transparent display.

The luminance information acquiring module 2 measures the background pattern 3 directly to obtain an original luminance information of the background pattern 3 and transmits the original luminance information of the background pattern 3 to the data processing module 1 in a state having no transparent display; the luminance information acquiring module measures the transparent display 4 to obtain the luminance information of the background pattern 3 diffused by the transparent display 4 and transmits the luminance information of the background pattern 3 diffused by the transparent display 4 to the data processing module 1 in a state of adding the transparent display 4 between the luminance information acquiring module 2 and the background pattern 3.

According to the original luminance information of the background pattern 3 and the luminance information of the background pattern 3 diffused by the transparent display 4 transmitted by the luminance information acquiring module 2, the data processing module 1 calculates a ratio of the luminance gradation widths of each of the black and white luminance horizontal cross points and a ratio of the luminance gradation widths of each of the black and white luminance vertical cross points on the background pattern in the states having the transparent display 4 or not as a clarity of the corresponding black and white luminance horizontal cross point and a clarity of the corresponding black and white luminance vertical cross point. Then, the data processing module calculates an average value of the clarities of all the black and white luminance horizontal cross points as a horizontal clarity CH of the transparent display 4 and determines a horizontal transparent effect of the transparent display 4 according to the horizontal clarity CH, and calculates an average value of the clarities of all the black and white luminance vertical cross points as a vertical clarity CV of the transparent display 4 and determines a vertical transparent effect of the transparent display 4 according to the vertical clarity CV. The detail calculation can be referred to the Step S3 to Step S7 in the aforesaid method of measuring the transparent effect of the transparent display. The repeated description is omitted here.

The system of measuring the transparent effect of the transparent display of the present invention can easily and effectively measure the transparent effect of the transparent display and can provide the basis for the comparison of the properties of the different transparent displays.

In conclusion, the present invention provides a method of measuring a transparent effect of a transparent display, comprises: first, measuring the background pattern directly to obtain an original luminance information of the background pattern and transmitting the original luminance information of the background pattern to the data processing module by the luminance information acquiring module; calculating the luminance gradation width of each of the black and white luminance horizontal cross points and luminance gradation width of each of the black and white luminance vertical cross points on the background pattern in the original state having no the transparent display respectively by the data processing module; then, adding the transparent display between the luminance information acquiring module and the background pattern and measuring the transparent display by the luminance information acquiring module to obtain the luminance information of the background pattern diffused by the transparent display and calculating calculates the luminance gradation width of each of the black and white luminance horizontal cross points and luminance gradation width of each of the black and white luminance vertical cross points by the data processing module; then, calculating a ratio of the luminance gradation widths of each of the black and white luminance horizontal cross points and a ratio of the luminance gradation widths of each of the black and white luminance vertical cross points in the states having the transparent display or not as a clarity of the corresponding black and white luminance horizontal cross point and a clarity of the corresponding black and white luminance vertical cross point by the data processing module and finally, calculating an average value of the clarities of all the black and white luminance horizontal cross points as a horizontal clarity of the transparent display and determining a horizontal transparent effect of the transparent display according to the horizontal clarity by the data processing module; and calculating an average value of the clarities of all the black and white luminance vertical cross points as a vertical clarity of the transparent display and determining a vertical transparent effect of the transparent display according to the vertical clarity by the data processing module. The present invention can easily and effectively measure the transparent effect of the transparent display and can provide the basis for the comparison of the properties of the different transparent displays. The measurement results are not affected by ambient luminance, thus are accurate and reliable. The system of measuring the transparent effect of the transparent display according to the present invention comprises a data processing module, a luminance information acquiring module, a background pattern and a transparent display. The luminance information acquiring module acquires the luminance information of the background pattern in the states having the transparent display or not respectively. The data processing module calculates a ratio of the luminance gradation widths of each of the black and white luminance horizontal cross points and a ratio of the luminance gradation widths of each of the black and white luminance vertical cross points on the background in the states having the transparent display or not as a clarity of the corresponding black and white luminance horizontal cross point and a clarity of the corresponding black and white luminance vertical cross point. Then, the data processing module calculates an average value of the clarities of all the black and white luminance horizontal cross points as a horizontal clarity of the transparent display and determines a horizontal transparent effect of the transparent display according to the horizontal clarity and calculates an average value of the clarities of all the black and white luminance vertical cross points as a vertical clarity of the transparent display and determines a vertical transparent effect of the transparent display according to the vertical clarity. The system can easily and effectively measure the transparent effect of the transparent display and can provide the basis for the comparison of the properties of the different transparent displays.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A method of measuring a transparent effect of a transparent display, comprising steps of:

Step S1, providing a data processing module, a luminance information acquiring module of communicating with the data processing module and a background pattern for acquiring luminance information by the luminance information acquiring module;

wherein the background pattern comprises a white background and a black background surrounding the white background;

Step S2, defining a plurality of horizontal test lines and a plurality of vertical test lines to the background pattern; wherein each of the horizontal test lines is through the white background and the black background with two black and white luminance horizontal cross points; each of the vertical test lines is through the white background and the black background with two black and white luminance vertical cross points;

Step S3, measuring the background pattern directly to obtain an original luminance information of the background pattern and transmitting the original luminance information of the background pattern to the data processing module by the luminance information acquiring module;

wherein the data processing module calculates and stores a luminance gradation width at the two black and white luminance horizontal cross points of each of the horizontal test lines and a luminance gradation width at the two black and white luminance vertical cross points of each of the vertical test lines in an original state;

Step S4, providing the transparent display and positioning the transparent display between the luminance information acquiring module and the background pattern;

Step S5, measuring the transparent display to obtain the luminance information of the background pattern diffused by the transparent display and transmitting the luminance information of the background pattern diffused by the transparent display to the data processing module by the luminance information acquiring module;

wherein the data processing module calculates and stores luminance gradation widths at the two black and white luminance horizontal cross points of each of the horizontal test lines and luminance gradation widths at the two black and white luminance vertical cross points of each of the vertical test lines in a state having the transparent display;

Step S6, calculating a ratio of the luminance gradation widths of each of the black and white luminance horizontal cross points of the states having the transparent display or not as a clarity of the black and white luminance horizontal cross point by the data processing module, wherein:

$CH_{i1} = dH'_{i1}/dH_{i1}$ $CH_{i2} = dH'_{i2}/dH_{i2}$ $CH_{i1}$ and $CH_{i2}$ respectively represent the clarities of the two black and white luminance horizontal cross points of an ith horizontal test line, $dH_{i1}$ and $dH_{i2}$ respectively represent the luminance gradation widths of the two black and white luminance horizontal cross points of the ith horizontal test line in the original state and are greater than zero, $dH'_{i1}$ and $dH'_{i2}$ respectively represent the luminance gradation widths of the two black and white luminance horizontal cross points of the ith horizontal test line in the state having the transparent display, i is an integer that is greater than zero;

and calculating a ratio of the luminance gradation widths of each of the black and white luminance vertical cross points of the states having the transparent display or not as a clarity of the black and white luminance vertical cross point by the data processing module, wherein:

$CV_{n1} = dV'_{n1}/dV_{n1}$
$CV_{n2} = dV'_{n2}/dV_{n2}$ $CV_{n1}$ and $CV_{n2}$ respectively represent the clarities of the two black and white luminance vertical cross points of an nth vertical test line, $dV_{n1}$ and $dV_{n2}$ respectively represent the luminance gradation widths of the two black and white luminance vertical cross points of the nth vertical test line in the original state and are greater than zero, $dV'_{n1}$ and $dV'_{n2}$ respectively represent the luminance gradation widths of the two black and white luminance vertical cross points of the nth vertical test line in the state having the transparent display, n is an integer that is greater than zero;

Step S7, calculating an average value of the clarities of all the black and white luminance horizontal cross points as a horizontal clarity of the transparent display and determining a horizontal transparent effect of the transparent display according to the horizontal clarity by the data processing module; and calculating an average value of the clarities of all the black and white luminance vertical cross points as a vertical clarity of the transparent display and determining a vertical transparent effect of the transparent display according to the vertical clarity by the data processing module.

2. The method of measuring the transparent effect of the transparent display according to claim 1, wherein as the horizontal clarity of the transparent display is equal to 1, the horizontal transparent effect of the transparent display is determined to be the best; as the horizontal clarity of the transparent display is larger than 1, the horizontal transparent effect of the transparent display is determined to be worse when the horizontal clarity is larger;

as the vertical clarity of the transparent display is equal to 1, the vertical transparent effect of the transparent display is determined to be the best; as the vertical clarity of the transparent display is larger than 1, the vertical transparent effect of the transparent display is determined to be worse when the vertical clarity is larger.

3. The method of measuring the transparent effect of the transparent display according to claim 1, wherein the data processing module is a computer.

4. The method of measuring the transparent effect of the transparent display according to claim 1, wherein the luminance information acquiring module is a luminance meter or an image sensor.

5. The method of measuring the transparent effect of the transparent display according to claim 1, wherein the transparent display is an active matrix organic light emitting diode transparent display or a liquid crystal transparent display.

6. The method of measuring the transparent effect of the transparent display according to claim 1, wherein the luminance gradient width is a distance corresponding to a luminance variation of 10% to 90% during a luminance gradation.

7. A system of measuring a transparent effect of a transparent display, comprising a data processing module, a luminance information acquiring module of communicating with the data processing module, a background pattern for acquiring luminance information by the luminance information acquiring module and a transparent display;

wherein the luminance information acquiring module measures the background pattern directly to obtain an original luminance information of the background pattern and transmits the original luminance information of the background pattern to the data processing module in a state having no transparent display; the luminance information acquiring module measures the transparent display to obtain the luminance information of the background pattern diffused by the transparent display and transmits the luminance information of the background pattern diffused by the transparent display to the data processing module in a state of adding the transparent display between the luminance information acquiring module and the background pattern;

wherein the data processing module calculates a horizontal clarity of the transparent display according to the original luminance information of the background pattern obtained by the luminance information acquiring module and the luminance information of the background pattern diffused by the transparent display and determines a horizontal transparent effect of the transparent display according to the horizontal clarity; and the data processing module calculates a vertical clarity of the transparent display and determines a vertical transparent effect of the transparent display according to the vertical clarity.

8. The system of measuring the transparent effect of the transparent display according to claim 7, wherein the data processing module is a computer.

9. The system of measuring the transparent effect of the transparent display according to claim 7, wherein the luminance information acquiring module is a luminance meter or an image sensor.

10. The system of measuring the transparent effect of the transparent display according to claim 7, wherein the transparent display is an active matrix organic light emitting diode transparent display or a liquid crystal transparent display.

11. A method of measuring a transparent effect of a transparent display, comprising steps of:

Step S1, providing a data processing module, a luminance information acquiring module of communicating with the data processing module and a background pattern for acquiring luminance information by the luminance information acquiring module;

wherein the background pattern comprises a white background and a black background surrounding the white background;

Step S2, defining a plurality of horizontal test lines and a plurality of vertical test lines to the background pattern; wherein each of the horizontal test lines is through the white background and the black background with two black and white luminance horizontal cross points; each of the vertical test lines is through the white background and the black background with two black and white luminance vertical cross points;

Step S3, measuring the background pattern directly to obtain an original luminance information of the background pattern and transmitting the original luminance information of the background pattern to the data processing module by the luminance information acquiring module;

wherein the data processing module calculates and stores a luminance gradation width at the two black and white luminance horizontal cross points of each of the horizontal test lines and a luminance gradation width at the two black and white luminance vertical cross points of each of the vertical test lines in an original state;

Step S4, providing the transparent display and positioning the transparent display between the luminance information acquiring module and the background pattern;

Step S5, measuring the transparent display to obtain the luminance information of the background pattern diffused by the transparent display and transmitting the luminance information of the background pattern diffused by the transparent display to the data processing module by the luminance information acquiring module;

wherein the data processing module calculates and stores luminance gradation widths at the two black and white luminance horizontal cross points of each of the horizontal test lines and luminance gradation widths at the two black and white luminance vertical cross points of each of the vertical test lines in a state having the transparent display;

Step S6, calculating a ratio of the luminance gradation widths of each of the black and white luminance horizontal cross points of the states having the transparent display or not as a clarity of the black and white luminance horizontal cross point by the data processing module, wherein:

$CH_{i1} = dH'_{i1}/dH_{i1}$
$CH_{i2} = dH'_{i2}/dH_{i2}$ $CH_{i1}$ and $CH_{i2}$ respectively represent the clarities of the two black and white luminance horizontal cross points of an ith horizontal test line, $dH_{i1}$ and $dH_{i2}$ respectively represent the luminance gradation widths of the two black and white luminance horizontal cross points of the ith horizontal test line in the original state and are greater than zero, $dH'_{i1}$ and $dH'_{i2}$ respectively represent the luminance gradation widths of the two black and white luminance horizontal cross points of the ith horizontal test line in the state having the transparent display, i is an integer that is greater than zero;

and calculating a ratio of the luminance gradation widths of each of the black and white luminance vertical cross points of the states having the transparent display or not as a clarity of the black and white luminance vertical cross point by the data processing module, wherein:

$CV_{n1} = dV'_{n1}/dV_{n1}$
$CV_{n2} = dV'_{n2}/dV_{n2}$ $CV_{n1}$ and $CV_{n2}$ respectively represent the clarities of the two black and white luminance vertical cross points of an nth vertical test line, $dV_{n1}$ and $dV_{n2}$ respectively represent the luminance gradation widths of the two black and white luminance vertical cross points of the nth vertical test line in the original state and are greater than zero, $dV'_{n1}$ and $dV'_{n2}$ respectively represent the luminance gradation widths of the two black and white luminance vertical cross points of the nth vertical test line in the state having the transparent display, n is an integer that is greater than zero;

Step S7, calculating an average value of the clarities of all the black and white luminance horizontal cross points as a horizontal clarity of the transparent display and determining a horizontal transparent effect of the transparent display according to the horizontal clarity by the data processing module; and calculating an average value of the clarities of all the black and white luminance vertical cross points as a vertical clarity of the transparent display and determining a vertical transparent effect of the transparent display according to the vertical clarity by the data processing module;

wherein as the horizontal clarity of the transparent display is equal to 1, the horizontal transparent effect of the transparent display is determined to be the best; as the horizontal clarity of the transparent display is larger than 1, the horizontal transparent effect of the transparent display is determined to be worse when the horizontal clarity is larger;

wherein as the vertical clarity of the transparent display is equal to 1, the vertical transparent effect of the transparent display is determined to be the best; as the vertical clarity of the transparent display is larger than 1, the vertical transparent effect of the transparent display is determined to be worse when the vertical clarity is larger;

wherein the data processing module is a computer;

wherein the luminance information acquiring module is a luminance meter or an image sensor;

wherein the luminance gradient width is a distance corresponding to a luminance variation of 10% to 90% during a luminance gradation.

12. The method of measuring the transparent effect of the transparent display according to claim 11, wherein the transparent display is an active matrix organic light emitting diode transparent display or a liquid crystal transparent display.

* * * * *